United States Patent [19]

Kaneshiro

[11] Patent Number: 4,893,771
[45] Date of Patent: Jan. 16, 1990

[54] COOKING POT LID STAND

[76] Inventor: Glenn T. Kaneshiro, 99-217 Leomanu Pl., Aiea, Hi. 96701

[21] Appl. No.: 279,958

[22] Filed: Dec. 5, 1988

[51] Int. Cl.$^4$ .............................................. F16M 11/00
[52] U.S. Cl. .................................. 248/176; 211/181; 248/175
[58] Field of Search ...................... 248/176, 175, 37.3, 248/174, 153, 146; 211/13, 181, 41, 33, 133; D6/468, 474

[56] References Cited

U.S. PATENT DOCUMENTS

| | | | |
|---|---|---|---|
| 1,994,195 | 3/1935 | Hay | 211/181 X |
| 2,475,500 | 7/1949 | Heliote | 248/176 |
| 2,972,414 | 2/1961 | Sipe | 211/13 |
| 3,094,215 | 6/1963 | Sipe | 211/13 |
| 3,532,225 | 10/1970 | Reed | 248/175 X |
| 4,099,441 | 7/1978 | Landon | 248/176 X |

Primary Examiner—J. Franklin Foss
Attorney, Agent, or Firm—George W. T. Loo

[57] ABSTRACT

A cooking pot lid stand for cooking pot lids, serving dish lids, casserole dish lids, or other lids which have a handle or knob at its top center. The stand includes a base attached to the underside of a cradle. The base includes two L-shaped rods of equal length and thickness. Each L-shaped rod includes a vertical and a horizontal. The vertical has a curved portion. The horizontal includes a flat section, an arch, and a bend. Cradle includes a V-shaped bar with an end portion and two legs, which arced outward. Each leg includes an arc portion and an end portion. The arc portion is bow shaped to create a lid cradle and the end portion is rounded. The legs of the cradle are tapered for a pleasing appearance. A lid is placed upside down on the cradle while adding ingredients, stirring ingredients or serving. The stand enables a person to work with both hands instead of trying to work with lid in one hand and provides a convenient place for lid while adding ingredients into pot or pan, stirring ingredients or serving. The stand will prevent mess left on a lid from dirtying a counter top, stove top, or table top while adding ingredients, stirring ingredients, or serving. The stand will prevent the leaving of burn marks on unprotected surfaces where the lids are normally placed.

3 Claims, 1 Drawing Sheet

COOKING POT LID STAND

BACKGROUND OF THE INVENTION

1. Field of Invention

This invention relates to a stand for cooking pot lids.

2. Description of the Prior Art

Heat-resistant pad or trivet. A trivet is an ornamental metal plate on very short legs, used under a hot dish to protect a table.

3. Disclosure Statement

I am not aware of any stand for cooking pot lids. My invention would allow a cooking pot lid to be placed upside down to prevent mess left on the lid from dirtying the counter top.

SUMMARY OF THE INVENTION

This invention relates to a stand for cooking pot lids, serving dish lids, casserole dish lids, or other lids which have a handle or knob at its top center. The stand enables a person to work with both hands instead of trying to work with lid in one hand and provides a convenient place for lid while adding ingredients into pot or pan, stirring ingredients or serving.

An object of this invention is to provide a stand for cooking lids, serving dish lids, casserole dish lids or other lids which have one handle or knob at its top center.

Another object of this invention is to provide a stand for cooking lids which will prevent mess left on a lid from dirtying a counter top, stove top, or table top while adding ingredients, stirring ingredients, or serving.

A further object of this invention is to provide a stand for cooking lids that will prevent a person from getting burnt from the hot lid while trying to place the lid upside down onto a counter top to prevent mess from lid from dirtying the counter top.

Still another object of this invention is to provide a stand for cooking lids that will provide a convenient place for lids while adding ingredients into pot or pan, stirring ingredients or serving.

A still further object of this invention is to provide a stand for cooking lids that will save clean up time from mess normally left from lids placed face down on a counter top.

Another object of this invention is to provide a stand for cooking lids that will prevent the leaving of burn marks on surfaces where the lids are normally placed.

Other objects, features and advantages of the present invention will be readily apparent from the following detailed description taken in connection with the accompanying drawing.

DESCRIPTION OF THE PREFERRED EMBODIMENT

Before explaining the present invention in detail it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not limitation.

Figure 1:
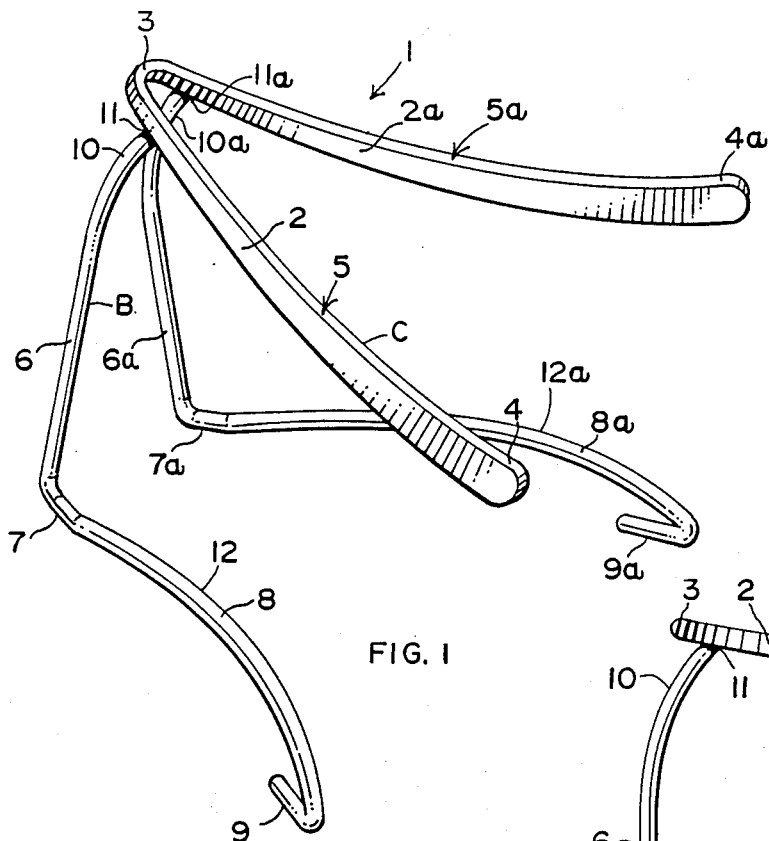
FIG. 1 is a perspective view of the stand.
Figure 2:
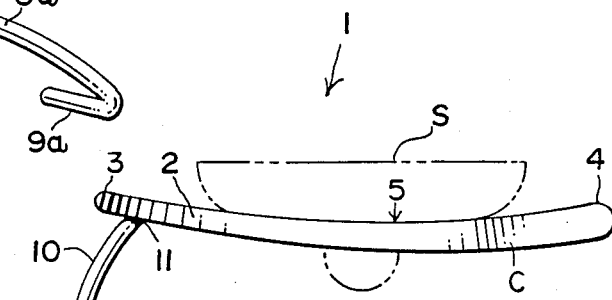
FIG. 2 is a left elevational view of the stand with a small lid shown in broken lines; the right elevational view is a mirror image.
Figure 3:
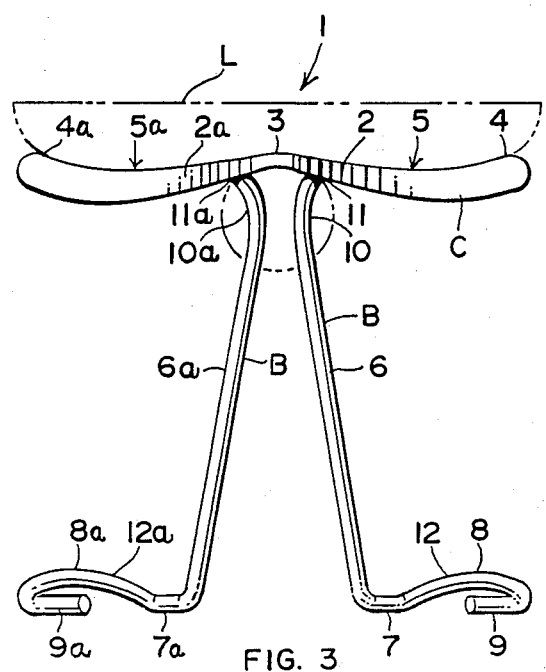
FIG. 3 is a rear elevational view of the stand with a large lid shown in broken lines.
Figure 4:
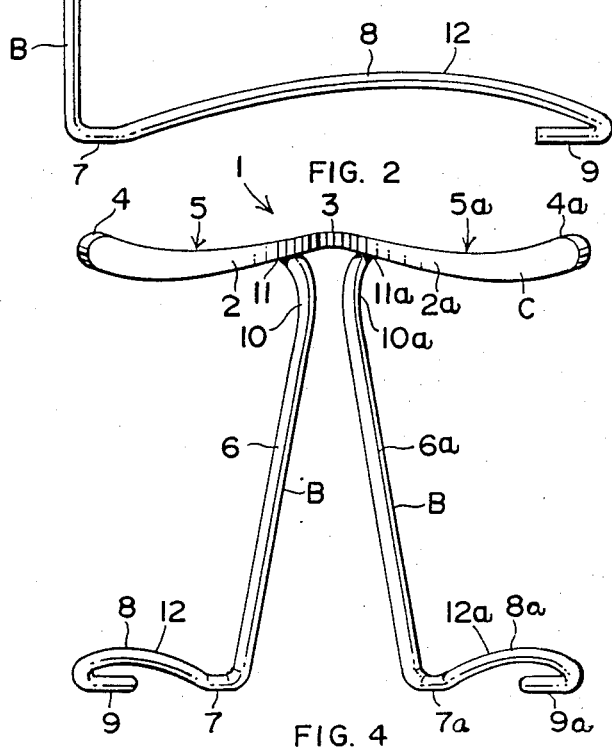
FIG. 4 is a front elevational view of the stand.

Referring now to the drawing wherein like reference numerals and letters refer to like and corresponding parts throughout the several views, the preferred embodiment of the invention disclosed in FIGS. 1-4 inclusive is a stand 1. Stand 1 includes a base B and a cradle C.

Base B includes two L-shaped rods of equal length and thickness. The left L-shaped rod includes a vertical 6 and a horizontal 8. Vertical 6 has a curved portion 10. Horizontal 8 includes a flat section 7, an arch 12, and a bend 9. The right L-shaped rod has the same parts designated with the same reference numeral accompanied by an "a". Base B should be broad enough to support the weight of a cooking pot lid and its undersurface may be made anti-skid for greater stability.

Cradle C includes a V-shaped bar with end portion 3, left leg 2, and right leg 2a. left leg 2 and right leg 2a arced outward to create a more opened vee. Left leg 2 includes arc portion 5 and end portion 4. Right leg 2a includes arc portion 5a and end portion 4a. Arc portions 5 and 5a are bow shaped to create a lid cradle. End portion 3 is rounded. Cradle C is tapered for a pleasing appearance.

Cradle C is attached to base B at 11 and 11a. Curved portions 10 and 10a are attached to the underside of legs 2 and 2a near end portion 3. Cradle C is generally parallel to base B.

Arc portions 5 and 5a, end portions 3, 4 and 4a stabilize a large lid. See FIG. 3. Flat sections 7 and 7a and bends 9 and 9a are designed for better stability and appearance. See FIG. 1.

I used steel rods for the base B and steel bar for cradle C. Cradle C is attached to base B by welding. But the stand can be constructed of any material that can withstand the heat produced from hot lids.

The operation of my invention is as follows: (1) Place stand near a cooking pot on counter top. (2) Place cooking pot lid upside down on cradle portion C, while adding ingredients, stirring ingredients or serving. The lid is placed upside down to prevent mess left on lid from dirtying the counter top. (3) Replace cooking pot lid on cooking pot.

The stand can be used for holding cooking pot lids, serving dish lids, casserole disk lids or other lids which have one handle or knob at its top center. The stand can handle most lid sizes and is easy to clean if necessary. The stand will prevent mess left on a lid from dirtying counter tops, stove tops, or table tops while adding ingredients, stirring ingredients or serving. The stand will enable a person to work with both hands instead of trying to work with a lid in one hand. The stand will save clean up time from mess left from lids placed face down on counter, tables, etc. The stand will prevent the leaving of burn marks on surfaces.

Although but a single embodiment of the invention has been disclosed and described herein, it is obvious that many changes may be made in the size, shape, arrangements, color and detail of the various elements of the invention without departing from the scope of the novel concepts of the present invention.

I claim as my invention:

1. A stand comprising of a base and a cradle; the base includes two L-shaped rods; the cradle includes a V-shaped bar; each L-shaped rod includes a vertical and a horizontal, the vertical has a curved portion and the horizontal has a flat section, an arch, and a bend; each of the two L-shaped rods is attached to the underside of a leg of the V-shaped bar, near an end portion of the V-shaped bar, wherein the V-shaped bar includes an end portion and two legs which are arced outward; each leg includes an arc portion and an end portion.

2. The stand of claim 1, wherein each leg of the V-shaped bar is tapered from its end portion.

3. A cooking pot lid stand comprising a base and a cradle; the base includes two L-shaped rods of equal length and thickness; each L-shaped rod includes a vertical and a horizontal; the vertical has a curved portion; the horizontal has a flat section, an arch, and a bend; the cradle includes an end portion and two legs which are arced outward; each leg includes an arc portion and an end portion; and the curved portion of the verticals are attached to the underside of the legs near the end portion of the cradle.

* * * * *